Figure 2:
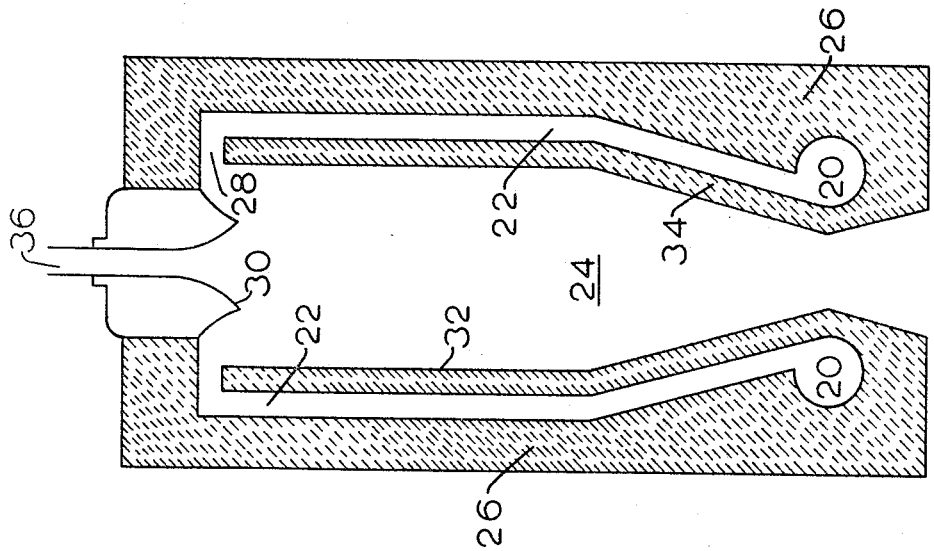

March 28, 1967     T. H. GOODGAME ETAL     3,311,452

PRODUCTION OF PYROGENIC PIGMENTS

Filed Oct. 23, 1962

3,311,452
PRODUCTION OF PYROGENIC PIGMENTS
Thomas H. Goodgame, Andover, and Randolph Antonsen, Boston, Mass., and Theodore D. Trowbridge, Stamford, Conn., assignors to Cabot Corporation, Boston, Mass., a corporation of Delaware
Filed Oct. 23, 1962, Ser. No. 232,541
4 Claims. (Cl. 23—202)

This invention relates to pyrogenic pigments and particularly to an improved process and apparatus for the production thereof.

Pyrogenic pigments and particularly pyrogenic titanium dioxide, are currently produced by various processes including the oxidation and/or hydrolysis of metal halide vapors at high temperatures, e.g. usually above about 800° C. One of the problems with the production of titanium dioxide by such processes involves the buildup of titanium dioxide on the inner walls of the reaction chamber wherein the titanium dioxide is formed. This buildup of titanium dioxide on the reaction chamber walls, aside from causing non-uniformity in the titanium dioxide product, due to over-sized particles of titanium dioxide periodically breaking loose and being collected with the product, also tends to reduce the reaction and flow space within the chamber and interfere with the removal of reaction products therefrom.

Another serious problem in the production of pyrogenic titanium dioxide relates to supplying auxiliary heat to the reaction chamber. Auxiliary heat is necessary because neither the oxidation reaction nor the hydrolysis reaction illustrated by the following equations (a) $\quad\quad\quad TiCl_4 + O_2 \rightarrow TiO_2 + 2Cl_2$ and (b) $\quad\quad\quad TiCl_4 + 2H_2O \rightarrow TiO_2 + 4HCl$ (wherein titanium tetrachloride is utilized as the titanium halide for the purposes of illustration), is normally thermally self-sufficient to the extent desirable in commercial operations. Therefore, auxiliary heat is usually supplied to the reaction chamber by means of a flame wherein hydrogen or carbon monoxide or other fuel gas is burned. The uniformity of such a flame is, however, normally difficult to control and thus the uniformity of the titanium dioxide product is often affected.

In accordance with the process and apparatus of the present invention, however, the buildup of titanium dioxide on the inner surface of the walls of the reaction chamber is significantly reduced or entirely eliminated and the problem of supplying a significant quantity of auxiliary heat to the reaction chamber more uniformly has been solved.

Accordingly, it is a principal object of the present invention to provide an improved process and apparatus for producing pyrogenic titanium dioxide.

It is another object of this invention to provide an improved process and apparatus for producing pyrogenic titanium dioxide while preventing or minimizing the buildup of titanium dioxide on the reaction chamber walls.

It is another object of the present invention to provide a process and apparatus for supplying auxiliary heat uniformly to a reaction chamber wherein pyrogenic titanium dioxide is being formed.

Other objects of the present invention will in part be obvious and will in part appear hereinafter.

In accordance with the present invention, it was discovered that when in producing titanium dioxide by the oxidation and/or hydrolysis of the vapors of a titanium halide at temperatures above about 800° C., the reaction chamber has a length to width ratio of at least 1.5, and preferably at least 2, and the inner surface of the walls of the reaction chamber are maintained at temperatures above about 800° C. and are sheathed with a blanket of gas, buildup of titanium dioxide on the walls is substantially reduced or entirely eliminated.

It was additionally discovered that by controlling the velocity and the temperature of the gas forming the gaseous blanket on the inner surface of the walls of the reaction chamber, the quantity of additional auxiliary heat that need be provided to the reaction chamber is likewise substantially reduced or entirely eliminated.

Thus, providing a blanket of hot gas adjacent the inner surface of the reaction chamber wall serves a dual purpose: (a) deposition of titanium dioxide on said inner surface is strongly discouraged, and (b) the quantity of auxiliary heat that need be supplied to the reaction chamber is sharply reduced or entirely eliminated.

The temperature at which the inner surface of the walls are maintained and the velocity of the gas forming the gaseous blanket in accordance with the process of the present invention were found to be critical. Specifically, it was determined that the velocity of the gas forming the gaseous blanket must be at least about as great as the velocity of the reaction mass if deposition on said walls is to be significantly reduced or entirely eliminated. With regard to the temperature of the inner surface of the walls of the reaction chamber, it was discovered that said inner surface must be maintained at temperatures of at least about 800° C. and preferably above the usual temperature of the reaction mass in the chamber, i.e., above about 1200° C.

From a practical viewpoint, the manner in which said inner surface of the walls is heated and maintained at the desired temperature has likewise been found to be important. Thus, it is generally preferred that said inner surface be heated by said moving blanket of gas. Under certain conditions, for example, depending upon the materials of construction of the reaction chamber walls, it has been found to be possible to supply some of the heat to said inner surface by heating the outer surface of the walls and relying upon heat transfer through the wall. However, it has been found that this method is not normally sufficient to maintain the inner surface of the walls above the minimum desirable temperature, i.e., above about 800° C. and accordingly heating the inner surface of the walls by means of said moving blanket of gas is definitely preferred.

The type of gas utilized in forming said blanket of gas, the manner of its production or the manner in which it is heated is not critical, so long as the gas utilized is inert to the titanium dioxide product and the various raw materials and by-products present in the reaction chamber, and is heated to a sufficiently high temperature and has a velocity at least equal to about that of the reacting mass. Thus, any inert gas(es) such as nitrogen may be utilized in forming the blanket of gas. Generally preferred, however, because they are inexpensively and easily produced, are combustion products such as carbon monoxide, carbon dioxide, sulfur dioxide and trioxide and the like.

The precise temperature to which the gas should be heated is, of course, dependent of many factors such as the precise velocity at which the gas will be introduced to the reaction chamber, upon whether the outer surface of the walls of the reaction chamber are being heated and if so, to what extent, upon how well the reaction chamber walls conduct heat and upon how much auxiliary heat it is desired that said gas provide to the reaction chamber. Obviously, however, the temperature of said gas normally should not be lower than the temperature at which the inner surface of the walls of the reaction chamber are to be maintained. Thus, care should be exercised to insure that the hot gas to be flowed adjacent the said inner surface is heated to a temperature at least as high as, and preferably at least somewhat higher than that of the reaction mass in the reaction chamber, the temperature of which may vary in the range of between about 800° C. and about 1600° C.

The process and apparatus of the present invention are generally applicable to the production of pyrogenic titanium dioxide by hydrolysis and/or oxidation of vapors of volatile titanium halides, particularly titanium tetrachloride, at temperatures above about 800° C. Thus, the present invention is applicable to reactions such as suggested by Gosta Flemmert in "Studies on Inorganic Fillers" published in 1953 by Dalarnes Tiduings-Och Boktrychkeri-AB, Sweden, or by United States Patents 2,488,439, 2,488,440 or 2,980,509.

Figure 1:
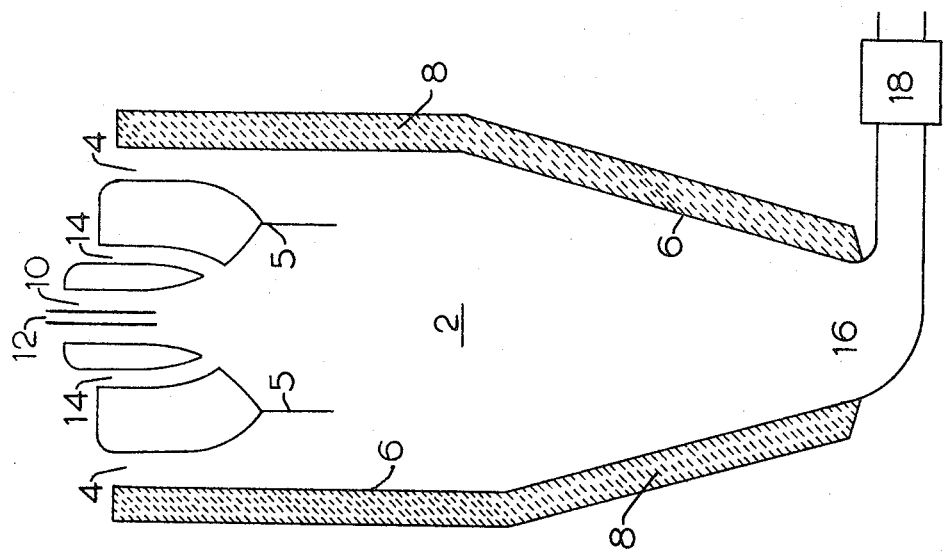

The present invention will be better understood and appreciated from the following description of preferred embodiments thereof selected for purposes of illustration and shown in the accompanying drawings in which:

FIGURE 1 is a schematic diagrammatic illustration of an embodiment of the present invention wherein apparatus is provided for flowing hot gases adjacent the inner walls of the reaction chamber; and FIGURE 2 is a schematic diagrammatic embodiment of the invention wherein apparatus is provided for flowing hot combustion gases adjacent both the outer and inner walls of the reaction chamber.

In a typical hydrolysis operation, referring now to FIGURE 1, carbon monoxide and air are burned to provide a stream of hot products of combustion having a temperature of about 1200° C. which is continuously introduced into insulated reaction chamber 2 by means of conduit 4 against guiding means 5, which causes said hot stream to flow adjacent the inner surface 6 of walls 8. When the temperature of inner surface 6 has risen above about 800° C., a mixture of titanium tetrachloride and dry air is introduced at high velocity into the reaction chamber by means of conduit 10. Continuously therewith, there is introduced to said chamber by means of conduit 12, a quantity of gas containing sufficient hydrogen to react with at least 50% of said titanium tetrachloride and preferably all thereof. (Auxiliary heat can be provided if desired by introducing carbon monoxide or additional hydrogen and oxygen separately by means of conduit 14.) Ignition results immediately and an immediate reaction occurs according to the following equation:

(c) 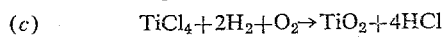  $TiCl_4 + 2H_2 + O_2 \rightarrow TiO_2 + 4HCl$ producing titanium dioxide particles that are essentially spherical in shape and that have an average particle diameter of between about 0.01 and 0.10 micron. The velocity of said hot stream of products of combustion being introduced into the chamber by means of conduit 4 and guide means 5, is then adjusted so that the velocity of said stream is approximately equal to the velocity of the reacting mass thus insuring that a hot protective blanket of gas is present over substantially the entire surface of inner surface 6. The titanium dioxide product, and the HCl and other by-products are then led by means of conduit 16 to quench 18, and subsequently recovered.

In another embodiment of the invention, referring now to FIGURE 2, hot combustion gases comprising sulfur oxides, oxygen, and nitrogen at a temperature of about 1200° C. produced by burning carbon disulfide and air in reaction zone 20, and flowed through conduit 22 formed by spacing reaction chamber 24 from insulated shell 26, and introduced through conduit 28 against guiding means 30 into chamber 24 so as to flow adjacent the inner surface 32 of walls 34. When the temperature of inner surface 32 has risen to about 900° C., a mixture of dry oxygen (or air) and titanium tetrachloride is introduced into chamber 24 by means of conduit 36 and ignition occurs immediately. (Alternatively, the oxygen and titanium tetrachloride carried in an inert medium could be introduced separately.) Ignition occurs immediately and the reaction according to the following equation:

(a) 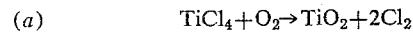  $TiCl_4 + O_2 \rightarrow TiO_2 + 2Cl_2$ proceeds to produce titanium dioxide having an average particle diameter of between about 0.2 and 0.3 micron. The velocity of said hot combustion gases is then adjusted so as to be approximately equal to the velocity of the reacting mass. The product is recovered as discussed above wtih reference to the apparatus of FIGURE 1.

A better understanding of the invention can be obtained from the following examples which, however, should be construed as being illustrative in nature and as not limiting the scope of the invention.

*Example 1*

To a reaction chamber of the type pictured in FIGURE 1 having a diameter of 3 feet and a length of 4 feet there is fed by means of conduit 14, the combustion products resulting from the burning of 0.04 ft.$^3$/sec. of CO and 0.27 ft.$^3$/sec. of air at 20° C. (the combustion products being 0.2 ft.$^3$/sec. of CO$_2$, 0.38 ft.$^3$/sec. of N$_2$, and 0.87 ft.$^3$/sec. of air), said combustion products having a temperature of about 1200° C. After the inner surfaces of the combustion chamber walls have risen to about 900° C., there is introduced into conduit 10, 0.04 lb./sec. of titanium tetrachloride suspended in 0.452 ft.$^3$/sec. of air, and into conduit 12, 0.1888 ft.$^3$/sec. of hydrogen gas as measured at 20° C. Immediate ignition occurs and there are produced in the reaction chamber 0.017 lb./sec. of titanium dioxide, 0.32 ft.$^3$/sec. of HCl, 0.027 ft.$^3$/sec. of H$_2$O and 0.36 ft.$^3$/sec. of N$_2$. The resultant temperature in the reaction chamber is 1200° C. and the resultant velocity of the entire mass of the reaction chamber is approximately $2/3$ ft./sec. After about 12 hours of continuous operation it is found that substantial accretion has occurred on the walls and that the accreted material is tending to plug up the reaction chamber as well as peel off the walls and contaminate the product.

*Example 2*

This example is a duplicate of Example 1 except that whereas in Example 1, the gaseous combustion products are added through conduit 14, in the present example said combustion products are introduced through conduit 4 which has a diameter of about 2.5 ft. at the tip thereof. The introduction of the combustion gases through conduit 4 produces a blanket of combustion gases along the inner surfaces of the reaction chamber, said blanket having a velocity of about $2/3$ ft./sec. and a temperature of about 1200° C. When titanium tetrachloride, air and hydrogen are introduced through conduits 10 and 12 as in Example 1, it is found that after about 24 hours of continuous operation substantial accretion has occurred on the walls and that the reaction chamber is quickly becoming plugged.

*Example 3*

This example is a duplicate of Example 1 except that in this example, the process is accomplished in a reaction chamber that has a diameter of three feet and a length of six feet instead of three feet and four feet respectively. After about three days of continuous operation it is found that substantial accretion has occurred on the walls and that the accreted material has a tendency to peel off the walls and contaminate the product.

*Example 4*

This example is a duplicate of Example 2 except that the reaction chamber has a diameter of three feet and a length of six feet instead of 3 feet and 4 feet respectively. After about a week of continuous operation, it is noted that no substantial accretion has occurred on the reaction chamber walls.

Obviously many changes can be made in the above described process, apparatus, examples and accompanying drawings without departing from the scope of the invention. For example, while the above examples specifically relate only to the production of titanium dioxide, it is clear that the present invention is applicable to the production of other metal oxides such as pyrogenic alumina. Accordingly, it is intended that the above disclosure be regarded as illustrative and as in no way limiting the scope of the invention.

What we claim is:

1. In the process of converting in an enclosed reaction zone metal halide in vapor form to the corresponding solid metal oxide in aerosol form by reacting said halide at temperatures above about 800° C. while preventing the precipitation of substantial solid matter on the walls of the enclosure, which process comprises introducing axially into one end of an enclosed reaction zone a metal halide and a co-reactant comprising a molecular oxygen-containing gas, conducting the aerosol formed in said zone from the end of said zone opposite to the end wherein said halide and co-reactant are introduced, and recovering the metal oxide therefrom, the improvement which comprises flowing said metal halide and said co-reactant into an enclosed reaction zone having a length to diameter ratio of at least 1.5, and flowing adjacent the interior surfaces of said enclosed zone and axially in the same direction as and at a velocity at least about equal to the velocity of the reaction mass therein, an inert gaseous stream heated to a temperature above about 800° C., thereby providing a protective blanket of very hot gas adjacent said surfaces and providing auxiliary heat to said zone.

2. The process of claim 1 wherein said inert gaseous stream is heated to a temperature between about 1200° C. and 1600° C.

3. The process of claim 1 wherein said metal halide comprises titanium tetrachloride.

4. The process of claim 1, wherein said inert hot gas is flowed adjacent the outer surfaces of said enclosed reaction zone as well as along the inner surfaces.

References Cited by the Examiner
UNITED STATES PATENTS

| 2,155,119 | 4/1939 | Ebner | 23—1 |
|---|---|---|---|
| 2,240,343 | 4/1941 | Muskat | 23—202 |
| 2,670,275 | 2/1954 | Olson et al. | 23—202 |
| 2,779,662 | 1/1957 | Frey | 23—202 |
| 2,823,982 | 1/1958 | Saladin et al. | 23—202 |
| 3,069,282 | 1/1962 | Allen | 23—202 |
| 3,078,148 | 2/1963 | Belknap et al. | 23—202 |
| 3,085,865 | 4/1963 | Long et al. | 23—277 |
| 3,086,851 | 4/1963 | Wagner | 23—277 |

OSCAR R. VERTIZ, Primary Examiner.

M. A. BRINDISI, MILTON WEISSMAN, Examiners.

E. STERN, Assistant Examiner.